United States Patent [19]

Swarts

[11] Patent Number: 5,662,846
[45] Date of Patent: Sep. 2, 1997

[54] ONE-STEP PROCESS FOR PRODUCING SOLID SURFACE MATERIAL WITH FOAM BACKING

[75] Inventor: Donald Eugene Swarts, Grand Island, N.Y.

[73] Assignee: E. I. Du Pont de Nemours and Company, Wilmington, Del.

[21] Appl. No.: 412,793

[22] Filed: Mar. 29, 1995

[51] Int. Cl.$^6$ .................................................. B29C 39/12
[52] U.S. Cl. ........................ 264/69; 264/108; 264/299; 264/DIG. 6
[58] Field of Search ................................ 264/69, DIG. 6, 264/271.1, 279.1, 45.1, 299, 108

[56] References Cited

U.S. PATENT DOCUMENTS

| | | | |
|---|---|---|---|
| 3,353,981 | 11/1967 | Jacob | 117/8 |
| 3,458,610 | 7/1969 | Sainty | 264/69 |
| 3,761,554 | 9/1973 | Barnette | 264/69 |
| 3,847,865 | 11/1974 | Duggins | 524/437 |
| 4,085,246 | 4/1978 | Vassiliou | 428/220 |
| 4,452,636 | 6/1984 | Laan | 264/69 |
| 4,595,623 | 6/1986 | DuPont et al. | 428/195 |
| 5,047,463 | 9/1991 | Keskey et al. | 264/69 |
| 5,173,233 | 12/1992 | Kafarowski | 264/69 |

FOREIGN PATENT DOCUMENTS

| | | | |
|---|---|---|---|
| 285046 | 10/1988 | European Pat. Off. . | |
| A 2352650 | 12/1977 | France | B29D 3/02 |
| 20 26 906 | 12/1971 | Germany | B29C 5/00 |
| 3516666 | 11/1986 | Germany | 264/69 |
| 44 07 321 | 9/1995 | Germany | C08K 7/18 |
| 814990 | 3/1981 | U.S.S.R. | 264/69 |
| A 1389380 | 4/1975 | United Kingdom | B29D 5/00 |

OTHER PUBLICATIONS

Database WPI, Week 7821, Derwent Publications Ltd., London, GB; AN 78–37608A, XP002019876 & JP,A,53 041 364 (Sekisui Chemi Ind.), Apr. 14,1978, see abstract, figures 1–4.

Database WPI, Week 9308, Derwent Publications Ltd., London, GB; AN 93–061277, XP002019877 & JP,A,05 008 227 (Inoac Corp.), Jan. 19, 1993, see abstract, figures 1–6.

Patent Abstracts Of Japan, vol. 018, No. 474 (M–1668), Sep. 5, 1994 & JP,A,06 15 5482 (Yoshio Niioka), Jun. 3, 1994, see abstract, figures 1–3.

Composites, vol. 25, No. 2, Mar. 1985, Paris, Fr, pp. 78–85, Doc. Glaverbel: "Microsphères creuses de verre. Leurs caractéristiques, leurs usages", see whole document.

Primary Examiner—Allan R. Kuhns

[57] ABSTRACT

A process for producing solid surface material is provided with a thin layer of filled polymer integrally formed with a backing of bubble-filled polymer, without an interface or transition zone in the polymer mix, using one-step casting, with vibration to aid separation of filler and bubbles.

2 Claims, No Drawings

5,662,846

ONE-STEP PROCESS FOR PRODUCING SOLID SURFACE MATERIAL WITH FOAM BACKING

BACKGROUND OF THE INVENTION

This invention relates to a process of producing a composite cast article having a polymeric solid surface with added filler and a backing of similar material also filled with hollow bubbles, with no transition zone of unfilled polymer between the layers.

Solid surface materials are known in the art including those based on polymethyl methacrylate and alumina trihydrate. Basic technology for these products is disclosed in U.S. Pat. Nos. 3,847,865—Duggins (1974), 4,085,246—Buser, Roedel and Vassiliou (1978), and published PCT patent application US88/14322—Frank, Otremba, Pohl and Schlier (1988).

Prior attempts to laminate such solid surface materials with bubble-filled backing material and fiberglass-reinforcement have led to expensive multi-step processes and to laminar products which had distinctly different layers with their own properties. Laminar products generally are more prone to delamination and other weaknesses due to the interface under certain conditions than integral products. Among the multi-layer, laminated products of this type is that of EP 285,046—Schock (1993).

All of the above-mentioned documents are incorporated herein by reference for their teachings of methods and materials for making solid surface filled polymeric materials. It would be desirable to be able to provide lighter weight sheet material with the surface characteristics of this solid surface material in integral form without laminar transitions between layers, and to be able to prepare such products by less expensive processes.

SUMMARY OF THE INVENTION

The present invention provides a process of producing the cast composite article comprising a polymer matrix and two zones of different filler, said article being substantially flat with two opposing faces, a first zone of such article including one face of the article having filler at a level in the range of 10 to 80% by weight of the filler plus matrix, and a second zone including the second face opposing said first face having filler of 5 to 60% and 3 to 30% of bubbles, both by weight of the filler and bubbles plus matrix, said first and second zones forming a continuum with essentially no layer of unfilled matrix between the two zones, said process comprising the steps of mixing together a curable mix comprising polymerizable monomer(s), polymerization initiator, filler and bubbles, said filler having a density at least 1.0 g/cc higher than that of the bubbles, casting the mix on a flat surface, applying vibration to aid the separation as the bubbles rise and a large part of the filler settles and allowing it to cure to polymerize the monomer(s), forming a east article having said two zones. Furthermore, ground particles of filled or untitled resin can be added to the mix in accordance with the ground particles taught in U.S. Pat. No. 4,085,246.

DETAILED DESCRIPTION

An advantage of the invention is that it provides a light weight, more economical solid surface material without any transition zone of polymer which could create a zone of brittleness or cause other mechanical difficulties.
One-Step Casting Procedure A polymerizable mix is prepared by adding two or more fillers to methyl methacrylate monomer or a blend of this monomer with a syrup comprised of polymethylmethacrylate dissolved in this monomer. In this example the fillers are 1) aluminum trihydrate, 2) hollow glass bubbles preferably, 3M "Scotchlite" S-22—10–100 μm, median 40 μm, and 3) a beige tinting pigment. The syrup comprises approximately 20% polymethylmethacrylate in monomer. A mixture is made by blending the following ingredients:

|  | Wt % |
| --- | --- |
| Methyl methacrylate | 50.5 |
| Syrup | 5.5 |
| Alumina trihydrate | 33.0 |
| "Scotchlite" S-22 (10–100 μm, median 40 μm,) glass bubbles | 11.0 |
|  | 100.0 |

A small amount of beige pigment (<1.0%) is added to tint the product. An initiator is added and the mix is evacuated to remove air. The mixture is then cast into a mold.

The mixture has a low viscosity (about 100 centipoise, 0.1 Psec.) which facilitates the fillers separating into layers according to their specific gravity compared to that of the liquid phase. The hollow glass bubbles (sp.gr. 0.22) will rise in the liquid (sp.gr. about 1.0) while the heavier aluminum trihydrate (sp.gr. 2.42) and beige pigment will settle to the bottom. Vibrating the mix prior to curing will speed up the separation of the fillers in the mixture and disperse the fillers more uniformly in their respective layers. After casting and curing in a 3.8 cm mold, there are two separate layers, a 0.8 cm face layer of acrylic polymer containing the alumina trihydrate and tint, and a 3.0 cm back layer containing the glass bubbles and aluminum trihydrate. However, there is no interface between the layers. They are integral, with the polymer matrix continuous throughout the structure. The thickness ratio of the face layer to the foam back layer with this composition was approximately 1:4. There was 73.8% alumina trihydrate in the face layer and 9.7% alumina trihydrate in the foam layer (as measured thermogravimetrically). All parts, percentages, and proportions herein are by weight except where indicated otherwise.

Having the heavier filler(s) in both the face and foam layer is desirable due to the property improvements imparted by this filler. Among those are improved strength and stiffness, resistance to impact damage, fire retardancy, color distribution and dimensional stability. The partition of the heavier filler(s) takes place after casting and before any gelling or curing. The amount in each layer is determined and controlled by several process variables, including the level in the original mix composition, mix viscosity, mix temperature and the amount of vibrating after casting. The range of heavier filler in the face layer is from 10 to 80% and in the foam layer from 5 to 60%, with preferred ranges of 30 to 60% for the face layer and 10 to 30% for the foam layer.

I claim:

1. A process of producing a cast composite article comprising a polymer matrix and two zones of different filler, said article being substantially flat with two opposing faces, a first zone of such article including one face of the article having filler at a level in the range of 10 to 80% by weight of the filler plus matrix, and a second zone including the second face opposing said first face having filler of 5 to 60% and 3 to 30% of bubbles, both by weight of the filler and bubbles plus matrix, said first and second zones forming a continuum with essentially no layer of unfilled matrix between the two zones, said process comprising the steps of mixing together a curable mix comprising polymerizable monomer(s), polymerization initiator, filler and bubbles, said filler having a density at least 1.0 g/cc higher than that of the bubbles, casting the mix on a flat surface, applying vibration to aid the separation as the bubbles rise and a large part of the filler settles and allowing it to cure to polymerize the monomer(s), forming a cast article having said two zones.

2. A process of producing a cast composite article comprising a polymer matrix and two zones of different filler, said article being substantially flat with two opposing faces, a first zone of such article including one face of the article having filler at a level in the range of 10 to 80% by weight of the filler plus matrix, and a second zone including the second face opposing said first face having filler of 5 to 60% and 3 to 30% of bubbles, both by weight of the filler and bubbles plus matrix, said first and second zones forming a continuum with essentially no layer of unfilled matrix between the two zones, said process comprising the steps of mixing together a curable mix comprising polymerizable monomer(s), polymerization initiator, filler and bubbles, said filler having a density at least 1.0 g/cc higher than that of the bubbles, casting the mix on a flat surface, wherein the bubbles rise and a large part of the filler settles and allowing it to cure to polymerize the monomer(s), forming a cast article having said two zones.

* * * * *